(12) United States Patent
Beaudoin et al.

(10) Patent No.: US 12,231,566 B2
(45) Date of Patent: *Feb. 18, 2025

(54) APPARATUS AND METHODS FOR PRODUCING DATA STRUCTURES HAVING INTERNAL SELF-REFERENCES SUITABLE FOR IMMUTABLY REPRESENTING AND VERIFYING DATA

(71) Applicant: Inveniam Capital Partners, Inc., New York, NY (US)

(72) Inventors: Valérie Beaudoin, Leesburg, VA (US); Evin T. Grano, Leesburg, VA (US); Patrick D. O'Meara, Northville, MI (US); Charles T. Shotton, Jr., Leesburg, VA (US)

(73) Assignee: Inveniam Capital Partners, Inc., New York, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/981,435

(22) Filed: Nov. 6, 2022

(65) Prior Publication Data

US 2023/0059806 A1 Feb. 23, 2023

Related U.S. Application Data

(63) Continuation of application No. 16/130,628, filed on Sep. 13, 2018, now Pat. No. 11,494,402.
(Continued)

(51) Int. Cl.
*G06F 21/60* (2013.01)
*G06F 16/182* (2019.01)
(Continued)

(52) U.S. Cl.
CPC .......... *H04L 9/3213* (2013.01); *G06F 16/182* (2019.01); *G06F 16/2379* (2019.01);
(Continued)

(58) Field of Classification Search
CPC ...... G06F 16/27; G06F 16/2379; G06F 21/64; G06F 21/602; H04L 9/50; H04L 9/0637
See application file for complete search history.

(56) References Cited

U.S. PATENT DOCUMENTS 4,309,569 A 1/1982 Merkle
5,499,294 A 3/1996 Friedman
(Continued)

FOREIGN PATENT DOCUMENTS

CN 107392618 A 11/2017
CN 110392052 A 10/2019
(Continued)

OTHER PUBLICATIONS

Encoding, Encryption, and Hashing by Andrea Chiarelli (Year: 2022).*
(Continued)

*Primary Examiner* — Hau H Hoang
(74) *Attorney, Agent, or Firm* — Koffsky Schwalb LLC

(57) ABSTRACT

Some embodiments described herein relate to a computer implemented method that includes performing a first work step associated with a first activity and with a first data product and performing a second work step associated with a second activity and associated with a second data product. A first chain of trust between the first work step and the second work step can be defined by defining a second manifest document that is associated with the second data product and that references a first manifest document associated with the first data product. An immutable data structure representing a second chain of trust independent of the first chain of trust can be defined by submitting the first manifest document and the second manifest document to a distributed ledger for validation.

24 Claims, 8 Drawing Sheets

Related U.S. Application Data

(60) Provisional application No. 62/558,142, filed on Sep. 13, 2017, provisional application No. 62/558,140, filed on Sep. 13, 2017.

(51) Int. Cl.
  *G06F 16/23* (2019.01)
  *G06F 16/27* (2019.01)
  *G06F 16/93* (2019.01)
  *G06F 21/64* (2013.01)
  *G06Q 40/06* (2012.01)
  *H04L 9/06* (2006.01)
  *H04L 9/32* (2006.01)
  *H04L 9/00* (2022.01)

(52) U.S. Cl.
  CPC ............. *G06F 16/27* (2019.01); *G06F 16/93* (2019.01); *G06F 21/602* (2013.01); *G06F 21/64* (2013.01); *G06Q 40/06* (2013.01); *H04L 9/0637* (2013.01); *H04L 9/0643* (2013.01); *H04L 9/50* (2022.05)

(56) References Cited

U.S. PATENT DOCUMENTS

| | | |
|---|---|---|
| 5,606,609 A | 2/1997 | Houser |
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens |
| 7,572,179 B2 | 8/2009 | Choi |
| 7,729,950 B2 | 6/2010 | Mendizabal |
| 7,730,113 B1 | 6/2010 | Payette |
| 8,245,038 B2 | 8/2012 | Golle |
| 8,266,439 B2 | 9/2012 | Haber |
| 8,359,361 B2 | 1/2013 | Thornton |
| 8,442,903 B2 | 5/2013 | Zadoorian |
| 8,560,722 B2 | 10/2013 | Gates |
| 8,612,477 B2 | 12/2013 | Becker |
| 8,706,616 B1 | 4/2014 | Flynn |
| 8,712,887 B2 | 4/2014 | Degroeve |
| 8,867,741 B2 | 10/2014 | Mccorkindale |
| 8,943,332 B2 | 1/2015 | Horne |
| 8,990,322 B2 | 3/2015 | Cai |
| 9,124,423 B2 | 9/2015 | Jennas, II |
| 9,378,343 B1 | 6/2016 | David |
| 9,396,006 B2 | 7/2016 | Kundu |
| 9,398,018 B2 | 7/2016 | Macgregor |
| 9,407,431 B2 | 8/2016 | Bellare |
| 9,411,524 B2 | 8/2016 | O'Hare |
| 9,411,976 B2 | 8/2016 | Irvine |
| 9,411,982 B1 | 8/2016 | Dippenaar |
| 9,424,576 B2 | 8/2016 | Vandervort |
| 9,436,923 B1 | 9/2016 | Sriram |
| 9,436,935 B2 | 9/2016 | Hudon |
| 9,472,069 B2 | 10/2016 | Roskowski |
| 9,489,827 B2 | 11/2016 | Quinn |
| 9,584,493 B1 | 2/2017 | Leavy |
| 9,588,790 B1 | 3/2017 | Wagner |
| 9,647,977 B2 | 5/2017 | Levasseur |
| 9,722,790 B2 | 8/2017 | Ebrahimi |
| 9,818,109 B2 | 11/2017 | Loh |
| 9,830,580 B2 | 11/2017 | Macgregor |
| 9,875,510 B1 | 1/2018 | Kasper |
| 9,876,646 B2 | 1/2018 | Ebrahimi |
| 9,882,918 B1 | 1/2018 | Ford |
| 10,025,941 B1 | 7/2018 | Griffin |
| 10,046,228 B2 | 8/2018 | Tran |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,163,080 B2 | 12/2018 | Chow |
| 10,270,599 B2 | 4/2019 | Nadeau |
| 10,346,815 B2 | 7/2019 | Glover |
| 10,355,869 B2 | 7/2019 | Bisti |
| 10,366,204 B2 | 7/2019 | Tanner, Jr. |
| 10,373,129 B1 | 8/2019 | James |
| 10,411,897 B2 | 9/2019 | Paolini-Subramanya |
| 10,419,225 B2 | 9/2019 | Deery |
| 10,438,285 B1 | 10/2019 | Konstantinides |
| 10,476,847 B1 | 11/2019 | Smith |
| 10,532,268 B2 | 1/2020 | Tran |
| 10,586,270 B2 | 3/2020 | Reddy |
| 10,628,268 B1 | 4/2020 | Baruch |
| 10,685,399 B2 | 6/2020 | Snow |
| 10,693,652 B2 | 6/2020 | Nadeau |
| 10,749,848 B2 | 8/2020 | Voell |
| 10,764,752 B1 | 9/2020 | Avetisov |
| 10,783,164 B2 | 9/2020 | Snow |
| 10,817,873 B2 | 10/2020 | Paolini-Subramanya |
| 10,826,685 B1 | 11/2020 | Campagna |
| 10,855,446 B2 | 12/2020 | Ow |
| 10,873,457 B1 | 12/2020 | Beaudoin |
| 10,915,895 B1 | 2/2021 | Fogg |
| 10,929,842 B1 | 2/2021 | Arvanaghi |
| 10,949,926 B1 | 3/2021 | Call |
| 10,956,973 B1 | 3/2021 | Chang |
| 10,958,418 B2 | 3/2021 | Ajoy |
| 10,997,159 B2 | 5/2021 | Iwama |
| 11,042,871 B2 | 6/2021 | Snow |
| 11,044,095 B2 | 6/2021 | Lynde |
| 11,044,097 B2 | 6/2021 | Snow |
| 11,044,100 B2 | 6/2021 | Deery |
| 11,063,770 B1 | 7/2021 | Peng |
| 11,075,744 B2 | 7/2021 | Tormasov |
| 11,093,933 B1 | 8/2021 | Peng |
| 11,134,120 B2 | 9/2021 | Snow |
| 11,164,250 B2 | 11/2021 | Snow |
| 11,164,254 B1 | 11/2021 | Gordon, III |
| 11,170,366 B2 | 11/2021 | Snow |
| 11,205,172 B2 | 12/2021 | Snow |
| 11,276,056 B2 | 3/2022 | Snow |
| 11,295,296 B2 | 4/2022 | Snow |
| 11,296,889 B2 | 4/2022 | Snow |
| 11,328,290 B2 | 5/2022 | Snow |
| 11,334,874 B2 | 5/2022 | Snow |
| 11,347,769 B2 | 5/2022 | Snow |
| 11,348,097 B2 | 5/2022 | Snow |
| 11,348,098 B2 | 5/2022 | Snow |
| 11,423,398 B1 | 8/2022 | Mullins |
| 2001/0029482 A1 | 10/2001 | Tealdi |
| 2003/0018563 A1 | 1/2003 | Kilgour |
| 2004/0085445 A1 | 5/2004 | Park |
| 2005/0206741 A1 | 9/2005 | Raber |
| 2006/0075228 A1 | 4/2006 | Black |
| 2006/0184443 A1 | 8/2006 | Erez |
| 2007/0027787 A1 | 2/2007 | Tripp |
| 2007/0094272 A1 | 4/2007 | Yeh |
| 2007/0174630 A1 | 7/2007 | Shannon |
| 2007/0296817 A1 | 12/2007 | Ebrahimi |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass |
| 2010/0228798 A1 | 9/2010 | Kodama |
| 2010/0241537 A1 | 9/2010 | Kass |
| 2011/0061092 A1 | 3/2011 | Bailloeul |
| 2011/0161674 A1 | 6/2011 | Ming |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |
| 2013/0276058 A1 | 10/2013 | Buldas |
| 2014/0022973 A1 | 1/2014 | Kopikare |

(56) References Cited

U.S. PATENT DOCUMENTS

| | | |
|---|---|---|
| 2014/0201541 A1 | 7/2014 | Paul |
| 2014/0229738 A1 | 8/2014 | Sato |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | Mccarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | Mccoy |
| 2016/0321751 A1 | 11/2016 | Creighton, IV |
| 2016/0321769 A1 | 11/2016 | Mccoy |
| 2016/0328791 A1 | 11/2016 | Parsells |
| 2016/0330031 A1 | 11/2016 | Drego |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0330279 A1 | 11/2017 | Ponzone |
| 2017/0344983 A1 | 11/2017 | Muftic |
| 2017/0346693 A1 | 11/2017 | Dix |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | Mccann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0081796 A1 | 3/2019 | Chow |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |

(56) References Cited

U.S. PATENT DOCUMENTS

| | | |
|---|---|---|
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005290 A1 | 1/2020 | Madisetti |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0234386 A1 | 7/2020 | Blackman |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0174353 A1 | 6/2021 | Snow |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0226769 A1 | 7/2021 | Snow |
| 2021/0226773 A1 | 7/2021 | Snow |
| 2021/0241282 A1 | 8/2021 | Gu |
| 2021/0248514 A1 | 8/2021 | Cella |
| 2021/0266167 A1 | 8/2021 | Lohe |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |

FOREIGN PATENT DOCUMENTS

| | | |
|---|---|---|
| CN | 110599147 A | 12/2019 |
| CN | 112329041 A | 2/2021 |
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |

(56) References Cited

FOREIGN PATENT DOCUMENTS

| KR | 101747221 | 6/2017 |
| WO | 0049797 | 8/2000 |
| WO | 2007069176 | 6/2007 |
| WO | 2015077378 | 5/2015 |
| WO | 2017190795 A1 | 11/2017 |
| WO | 2018013898 A1 | 1/2018 |
| WO | 2018109010 | 6/2018 |
| WO | 2018127923 A1 | 7/2018 |
| WO | 2018127923072018 | 7/2018 |
| WO | 2019180702 | 9/2019 |
| WO | 2019207504 | 10/2019 |
| WO | 2020125839 A1 | 6/2020 |

OTHER PUBLICATIONS

Al-Naji, Nader et al., "Basis: A Price-Stable Cryptocurrency with an Algorithmic Central Bank" www.basis.io Jun. 20, 2017, 27 pages.

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Casey, "BitBeat: Factom Touts Blockchain Tool for Keeping Record Keepers Honest", Wall Street Journal, Nov. 5, 2014.

Chakravorty, Antorweep, and Chunming Rong, "Ushare: user controlled social media based on blockchain." Proceedings of the 11th International Conference on Ubiquitous Information Management and Communication. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018).

Eberhardt et al., "ZoKrates - Scalable Privacy-Preserving Off-Chain Computations," https://ieeeexplore.ieee.org/stamp/JSP?tp:::&armumber:::8726497. (Year:2018).

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, May 17, 2018, 15 pages.

Iddo Bentov, Bitcoin and Secure Computation with Money, May 2016 (Year: 2016).

Kim et al., "A Perspective on Blockchain Smart Contracts," Schulich School of Business, York University, Toronto, Canada, 2017, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018).

Luther, "Do We Need A "Fedcoin" Cryptocurrency?," ValueWalk, Newstex Global Business Blogs, Dec. 30, 2015 (Year: 2015).

Luu et al., Making Smart Contracts Smarter, 2016.

Menezes, Alfred. J., et al. "Handbook of Applied Cryptography," 1997, CRC Press, p. 527-28.

Merkle Mountain Ranges (MMRs)—Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. lle:///C:/Users/eoussir/Documents/e-Red%20Folder/16905961/NPL_MOF_BC_A%20Memory%20Optimized%20and%20Flexible%20Blockchain.pdf (Year:2018) 43 pages.

Muhamed et al. EduCTX: A Blockchain-Based Higher Education Credit Platform, https://ieeexplore.ieee.org/stamp/stamp.jsp?arnumber=8247166. (Year: 2017). 16 pages.

On blockchain and its integration with IoT. Challenges and opportunities. file:///C:/Users/eoussir/Downloads/1-s2.0 80167739X17329205-main%20(1).pdf (Year: 2018) 18 pages.

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815?accountid=131444 (Year: 2011).

United States: New Generation cryptocurrency, USDX Protocol, Offers Crypto Advantages and Fiat Pegging, Apr. 2, 2018 (Year: 2018).

Unknown, "Federated Learning: Collaborative Machine Learning without Centralized Training Data" Apr. 6, 2017, 11 pages.

Unknown, "Midex", https://promo.midex.com/Midex_EN.pdf, 2017, 25 pages.

Unknown, Xtrade White Paper, https://xtrade1-9649.kxcdn.com/wp-content/uploads/2017/09/xtrade-whitepaper.pdf Feb. 7, 2018, 37 pages.

Watanabe, Hiroki, et al. "Blockchain contract: Securing a blockchain applied to smart contracts." 2016 IEEE International Conference on Consumer Electronics (ICCE). IEEE, 2016.

White, Ron, "How Computers Work," Oct. 2003, Que, Seventh Edition (Year: 2003), 23 pages.

Why offchain storage is needed for blockchain_V4_1 Final (Year: 2018), by IBM, 13 pages.

Written Opinion in PCT/US2021/040207, Inventor Snow, Mail date Oct. 7, 2021, 14 pages.

ZoKrates—Scalable Privacy-Preserving Off-Chain Computations, by Jacob Eberhardt, Stefan Tai , 8 pages, Nov. 3, 2011 (Year: 2011).

\* cited by examiner

APPARATUS AND METHODS FOR PRODUCING DATA STRUCTURES HAVING INTERNAL SELF-REFERENCES SUITABLE FOR IMMUTABLY REPRESENTING AND VERIFYING DATA

CROSS REFERENCE TO RELATED APPLICATIONS

This application is a continuation of non-provisional application Ser. No. 16/130,628, filed Sep. 13, 2018, which claims the benefit of priority of U.S. Provisional Application Nos. 62/558,140 and 62/558,142, each filed Sep. 13, 2017, the disclosure of each of which is hereby incorporated by reference in its entirety. This application is related to U.S. Non-Provisional application Ser. No. 16/130,619, now U.S. Pat. No. 10,873,457, filed Sep. 13, 2018, and, at the time of filing, entitled "Data Structure Having Internal Self-References Suitable for Immutably Representing and Verifying Data Generated over Time and Apparatus and Methods for Producing and Interacting with Such Data Structures," the disclosure of which is hereby incorporated by reference in its entirety.

FIELD

The present application generally relates to a chain of data structures each having an internal reference to other data structures in the chain and methods and apparatus for creating and interacting with such data structures. The data structures can be committed to a distributed ledger.

BACKGROUND

As opposed to a simple or bilateral transaction a complex transaction involves multiple participants and may include non-principal third parties such as regulators, auditors, financial modelers, legal advisors, and so forth. A complex transaction may involve long periods of time (months to years) to complete and may involve voluminous transaction data, including transfer of assets, satisfaction of assets, as well as data products generated by non-principal third parties such as regulatory approval, audit reports, financial models, legal opinions, and so forth that the complex transaction incorporates or relies upon. Example complex transactions are private equity transactions, securities trading, commercial banking, energy trading, municipal bonds, and so forth. Generally speaking, a complex transaction is a transaction involving three or more participants that cannot be reduced to a set of computerexecutable instructions that completely describes the transaction.

Some known distributed ledger systems may be suitable to carry out relatively simple (e.g., bilateral) transactions using "smart contracts," or the like. Such known distributed ledger systems, however, typically assume that an entire transaction can be reduced to computer-executable code that can be automatically triggered when certain conditions are met. This assumption does not hold for many complex transactions. Often events and data products associated with complex transactions cannot be reduced to computer-executable code, and may depend upon underlying legal instruments that cannot be stored on a distributed ledger system, such as original deeds and notes. Embodiments described herein generally relate to systems and methods that include both an on-ledger trust system (e.g., using known distributed ledger or blockchain) transaction verification systems and an off-ledger trust system which is described in further detail herein.

DETAILED DESCRIPTION

Figure 1A:
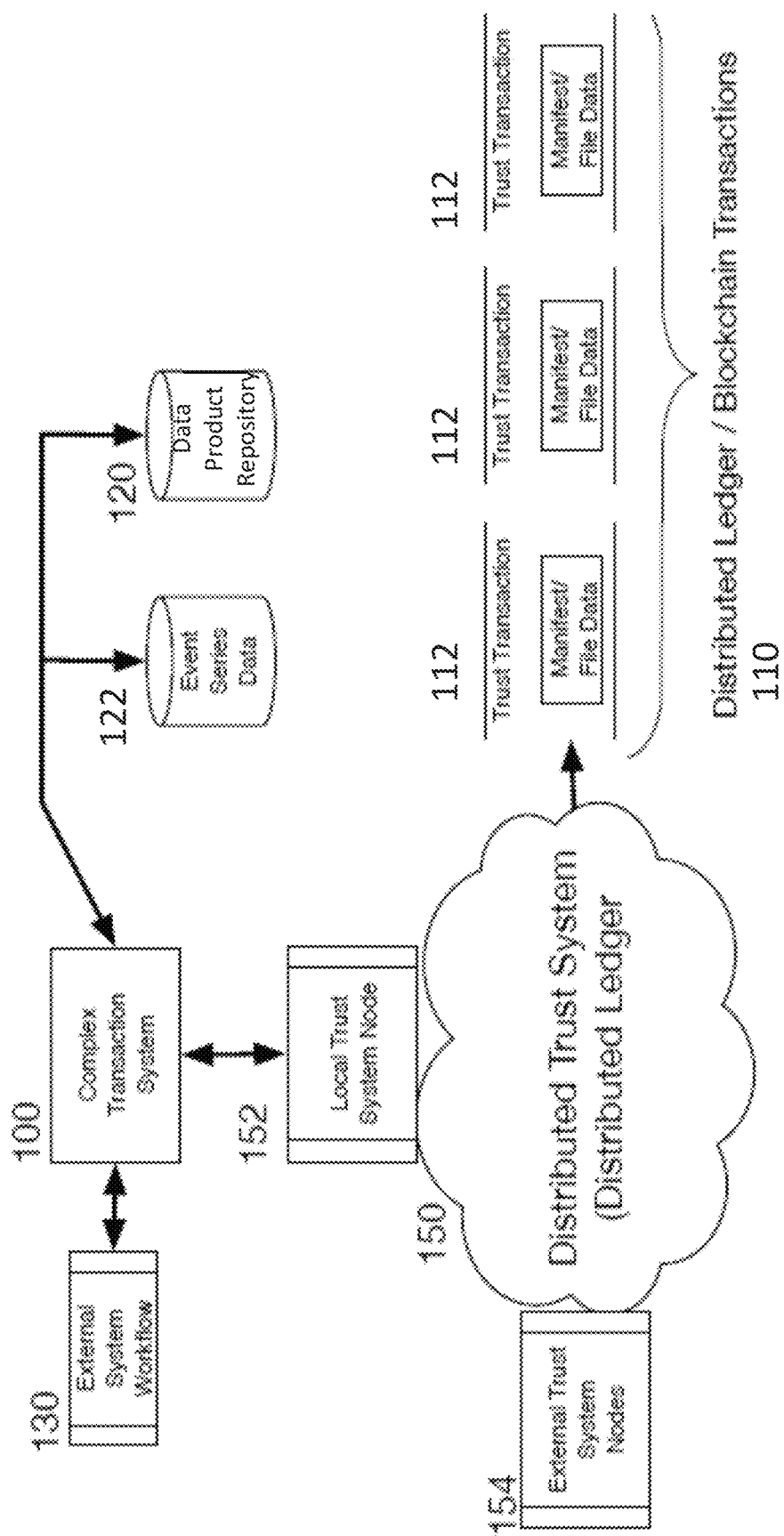
FIG. 1A is a schematic representation of a system operable to process, store, and/or reference events associated with a complex transaction, according to an embodiment.

Some embodiments described herein relate to a first compute device having a non-transitory processor readable memory and a processor that is a node of a distributed database. Similarly stated the first compute device along with other nodes (other compute devices) can collectively implement a distributed database, such as a blockchain ledger. The first compute device can therefore store a first instance of the distributed database. The first instance of the distributed database (and typically all instances of the distributed database) can include a first manifest document. The first manifest document can be associated with a first activity and/or work step of a complex transaction. The first manifest document can include a reference to a first data product associated with the first activity that is stored in a first data repository, for example off the distributed ledger. The first instance of the distributed database (and typically all instances of the distributed database) can include a second manifest document similar to the first manifest document. The second manifest document can be associated with a later time than the first manifest document and can therefore be stored in a later block on the distributed ledger than the first manifest document. The second manifest document can include a reference to the first manifest document and a reference to a second data product that is stored in a second data repository, for example off the distributed ledger. The first compute device can receive an indication of an activity associated with a third data product and, in response, define a third manifest document that references the third data product and the second manifest document. The first compute device can commit the third manifest document to the first instance of the distributed database and send a signal to a second compute device (e,g., another node of the distributed database) such that the second compute device commits the third manifest document to the second instance of the distributed database. In this way, the third manifest document can be committed to all instances of the distributed database.

Some embodiments described herein relate to a computer implemented method that includes defining a first manifest document associated with a first activity that is associated with and references a non-digital artifact maintained in a physical artifact repository. The first manifest document can be cryptographically encoded to produce a first archive. The first archive can then be submitted to a distributed ledger for validation. A second manifest document associated with a second activity and that references the first archive and a second data product associated with the second activity can be defined and submitted to the distributed ledger for validation. The second data product can be submitted to a digital data repository, which may be different from the distributed ledger.

Some embodiments described herein relate to a computer implemented method that includes performing a first work step associated with a first activity and with a first data product and performing a second work step associated with a second activity and associated with a second data product. A first chain of trust between the first work step and the second work step can be defined by defining a second manifest document that is associated with the second data product and that references a first manifest document associated with the first data product. An immutable data structure representing a second chain of trust independent of the first chain of trust can be defined by submitting the first manifest document and the second manifest document to a distributed ledger for validation.

Figure 1B:
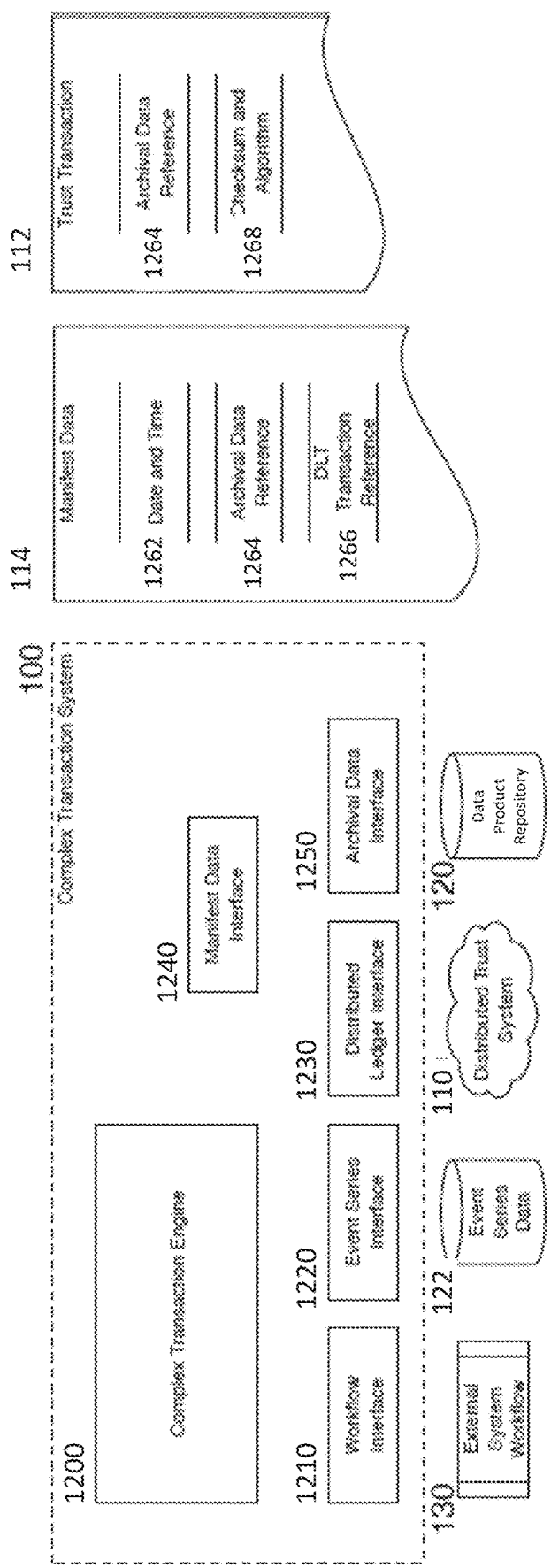
FIG. 1B is a logical schematic representation of the system of FIG. 1A, according to an embodiment.
Figure 2:
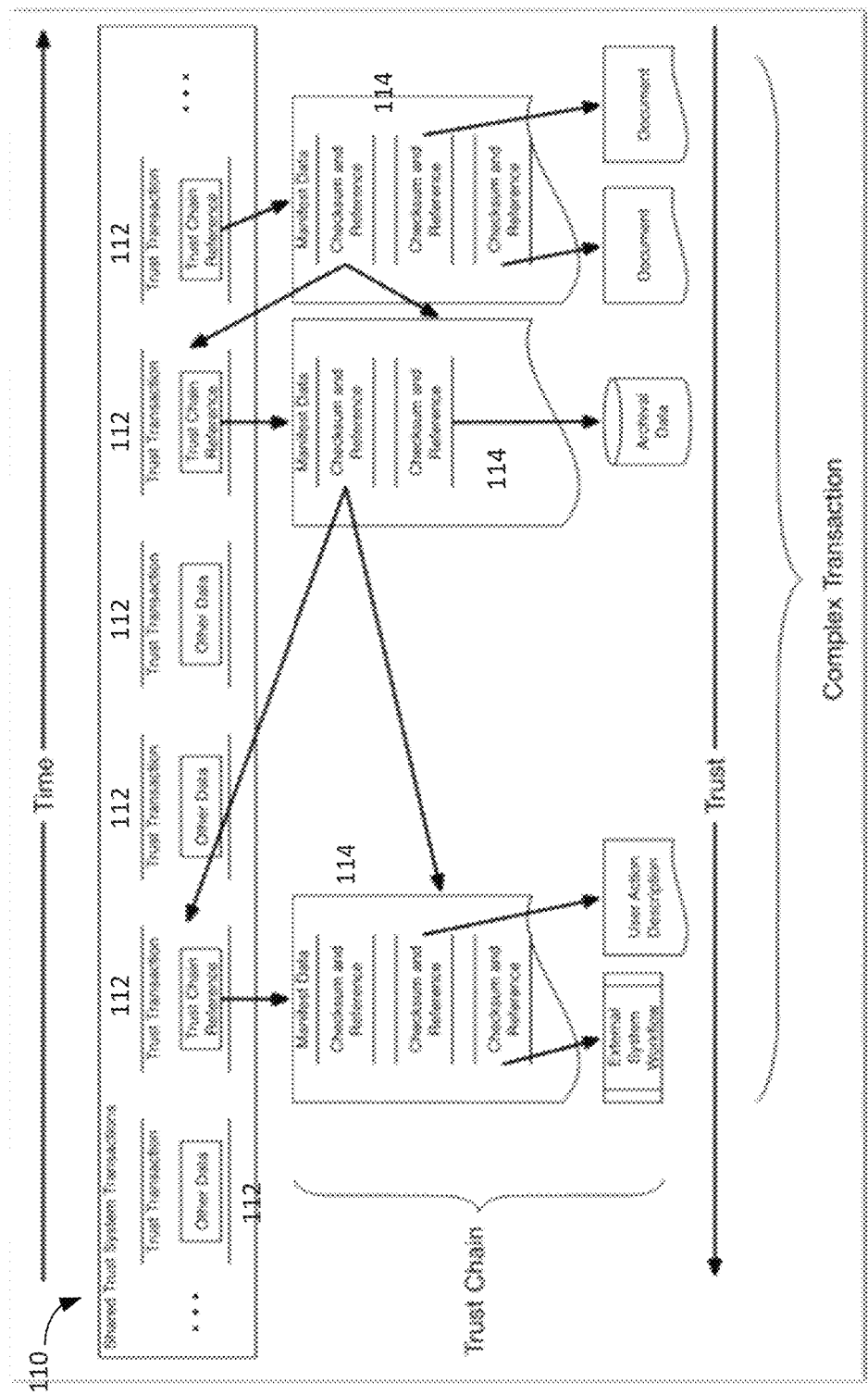
FIG. 2 is an example data structure associated with a complex transaction, such as may be generated by the systems of FIGS. 1A and/or 1B.

FIG. 1A is a schematic representation of a system operable to process, store, and/or reference events associated with a complex transaction, according to an embodiment. FIG. 1B is a logical schematic representation of the system of FIG. 1A, according to an embodiment. FIG. 2 is an example data structure associated with a complex transaction, such as may be generated by the systems of FIGS. 1A and/or 1B.

A complex transaction system 100 includes one or more cooperating computer systems (each having a processor and a memory) and associated software that, when executed, is operable to define and/or interpret data models representing a complex multi-step process, execute (or initiate the execution of) activities associated with the complex transaction, record the results of activities into event series data products 122, and/or store any related artifacts produced as a result of the activity in a repository for data products 120. In some instances, the complex transaction system 100 can commit transactions to a shared trust system 150, The shared trust system 150 can include, define, and/or manage a distributed ledger 110, such as the ethereum network. As discussed in further detail herein, transactions committed to the distributed ledger can include encrypted archives 112 that can contain manifest documents, data products (e.g., data files), and/or copies of or references to previous transactions. As discussed in further detail herein external trust system nodes 154 can be operable to validate contents of the archives 112 independently of the distributed ledger itself.

The complex transaction system 100 can include a complex transaction engine 1200. The complex transaction engine 1200 can include one or more cooperating software (executing on a processor) and/or hardware modules operable to execute sequencing, flow control, and/or messaging between a workflow interface 1210, an event series interface 1220, a distributed ledger interface 1230, a manifest data interface 1240, and/or an archival data interface 1250. The complex transaction engine 1200 can be operable to create archives 112 or trust transactions under programmatic control, for example, based on time-triggers, external programmatic inputs to the complex transaction engine 1200 (e.g., from an external system workflow 130), a manual interaction with a human user, or other external computer system process. The complex transaction engine 1200 can submit such archives 112 to the distributed ledger 110 for validation, e.g., via the distributed ledger interface 1230, such that the archives 112 are committed to the distributed ledger. The distributed ledger interface 1230 can further be operable to read transaction or other data from the distributed ledger.

Each archive 112 represents one or more manually-initiated or automatically-performed activities associated with the complex transaction (e.g., a dividend payment, an audit report, a regulatory filing, a share/security sale, etc.). Each archive 112 can be cryptographically encoded, affixed with appropriate tamper-proof data signatures, and/or committed to the distributed ledger over time as it is created. Archives can also include an archival data reference 1264 that uniquely identifies an information asset contained within the archive 112. Additionally, in some instances, an archive 112 can include a checksum 1268 of data held in the archive 112 and/or a checksum algorithm identifier (e.g., "SHA256"), As discussed in further detail herein, each archive 112 may contain, identify, and/or reference earlier transactions on the distributed ledger (e.g., earlier archives), earlier transactions that are maintained separately from the distributed ledger (e.g., an archive 112 can contain a reference to trust information, such as a verifiable cryptographic signature representing that a trusted transaction participant certifies that an activity occurred or the status of non-digital information), data products 120 associated with the current activity, a description of the current activity, and/or references to data products 120 associated with the current or previous activities that are maintained separately from the distributed ledger. The time series 110 of archives 112 represents part or all of the workflow of a complex transaction. The archives 112 store information related to the semantics of the complex transaction including, for example, information identifying authorized individuals performing or involved in activities, the result of activities, electronic data products produced by activities, instructions describing the conditions that caused the activity to occur, and/or instructions for simulating or recreating the activity.

The archival data interface 1250 of the complex transaction system can be operable to define, access, read, store, and otherwise provide a programmatic interface between the complex transaction engine 1200 and data products 120. The archival data interface 1250 can also be operable to define a look-up table that can allow a mapping between data products 120 (or indicators associated with data products 120) database keys, and unique identifiers or names from external storage locations into a uniform series of identifiers. As discussed in further detail herein, data products 120 can be externally stored (e.g., stored off the distributed ledger), so the mapping of uniform identifiers to external references, which may be highly variable in form and/or structure, can allow archives 112 and/or manifest documents 114 to provide or reference immutable references to data products 120 whose storage locations may change over time. The archival data interface 1250 can also be operable to calculate and verify data checksums or fingerprints and report information on algorithms used to calculate such checksums or fingerprints.

The manifest data interface 1240 of the complex transaction system 100 can be operable to define a manifest document 114, which can be included within at least some archives 112. Similarly stated, at least some of the archives 112 can be decrypted to retrieve a manifest document 114, which can include the date and time 1262 that the manifest document 114 was created, data products, references to data products 1264, identifiers of persistent electronic locations of data products 1264, checksums of fingerprints for data products, which may be contained within or stored separately from the manifest document 114, workflow definitions that were executed to produce data products, checksums for workflow definitions, public-key signed references to individuals/electronic systems that performed actions associated with the event, references to distributed ledger transactions associated with prior events, and/or references to additional (e.g., prior) manifest documents 1266.

As discussed above, archives 112 can be committed to a distributed ledger system as they are created. Similarly stated, each archive 112 can be submitted to the distributed ledger such that a copy of the archive is stored in a block of each copy of the distributed ledger maintained by local trust system nodes 152 (e.g., computer systems participating in the distributed trust system 150), ensuring the immutability of the archive. Thus, an archive 112 can include an encrypted manifest document 114, a reference to a manifest document 114, a signature of a manifest document 114, a unique activity identifier, and/or the activity date. The distributed ledger therefore establishes a public, ledger-based trusted, immutable time series record of the activities that make up a complex transaction. As discussed in further detail herein, each manifest document 114 can reference related manifests and/or activities that were generated or occurred earlier in time and previously committed to the distributed ledger.

Because manifest documents 114 can include references to earlier manifest documents 114 that are stored on the distributed ledger, for example, by identifying a location on the distributed ledger where an archive 112 containing an earlier manifest document 114 can be located, a trust chain can be created independently of the distributed ledger. A manifest document 114 can further include a checksum, fingerprint, or other description of an earlier manifest document 114 such that that earlier manifest document 114 can be uniquely identified. In this way, a series of manifest documents 114, where each manifest document 114 references at least one previous manifest document 114 creates a trust chain that is not dependent on the distributed ledger itself. Similarly stated, even in the absence of the distributed ledger, an individual with access to the series of manifest documents 114 could have confidence that the series of manifests represents an unchanged accounting of the complex transaction because each manifest uniquely identifies (e.g., through a fingerprint or checksum) at least one previous manifest. The trust chain that is independent from the distributed ledger can extend arbitrarily far back in time, for example to the origination of the complex transaction. The series of manifest documents 114 can represent the time linear flow of activities and transactions related to the complex transaction that culminates in the final manifest document 114, which can represent the most recent activity that occurred in the complex transaction and/or that was committed to the distributed ledger.

The workflow interface 1210 of the complex transaction system 100 can provide a programmatic interface between the complex transaction system engine 1200 and external system workflows 130. The external system workflow can be a compound data structure configured to model a sequence of events to be performed to execute a complex transaction. Such data models may define computational actions to perform, steps to be performed by a human participant, transformations to be applied to data products, and/or transactions to be performed with external systems. The workflow interface 1210, therefore, can be operable to invoke external workflow steps, receive data describing (externally) executed steps, and the results of (externally) executed steps for subsequent use by the event series interface 1220 in persisting the results of the workflow execution.

The event series interface 1220 can provide a programmatic interface between the complex transaction engine 1200 and the event series data store 122. The event series data store 122 can be computer-readable data structure, such as a keyed, indexed, or relational database that may be configured for creation, reading, updating, and/or deleting event series records. The event series data store 122 can be operable to store a series of data records that record data and time of activities of the complex transaction, references to participants (human users and/or automated systems) involved in the complex transactions, actions performed in an external system workflow 130, references to data products 120, and so forth.

Figure 3:
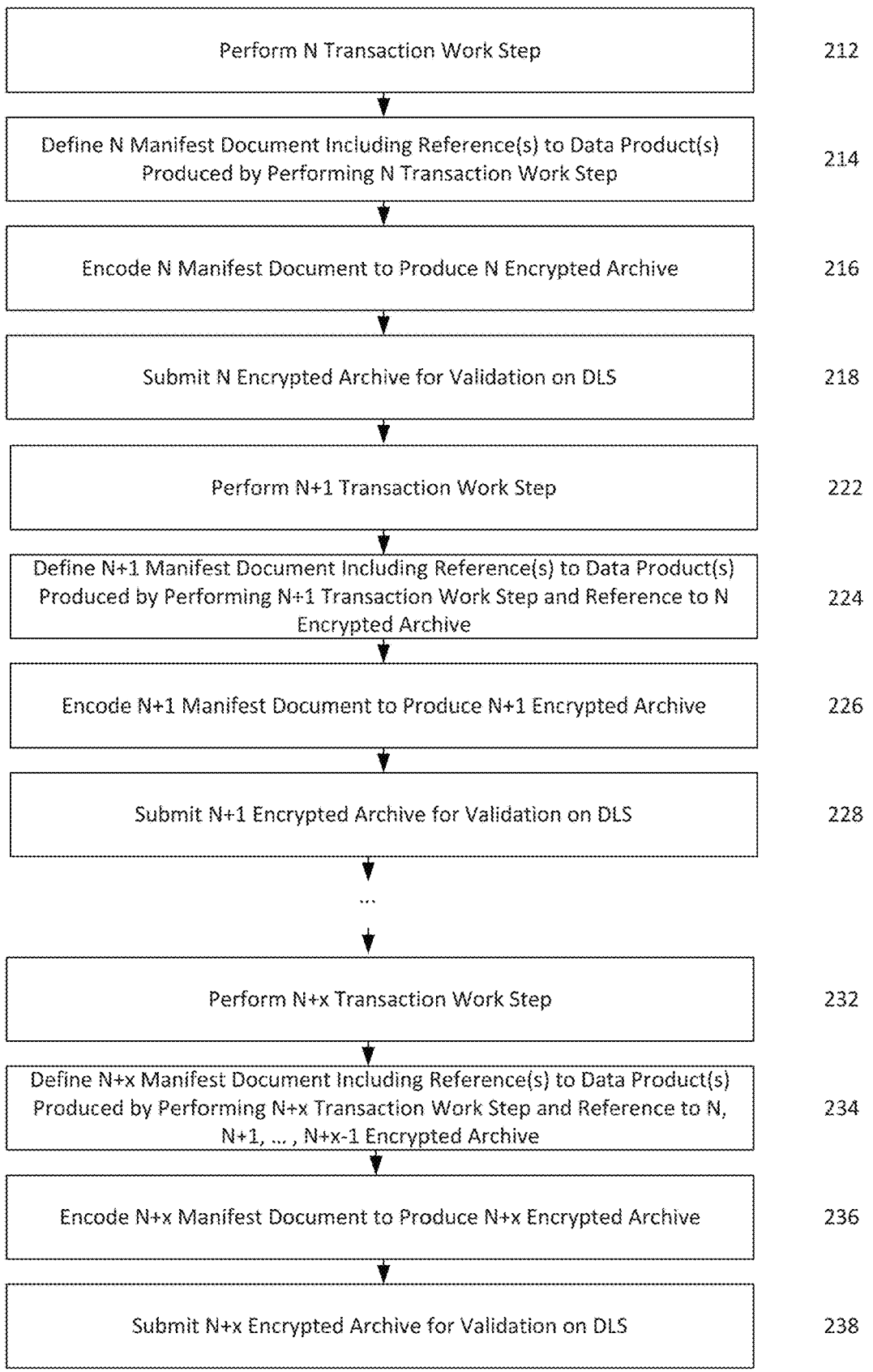
FIG. 3 is a flow chart of a method for representing a complex transaction as cryptographically secure data, according to an embodiment.
Figure 6:
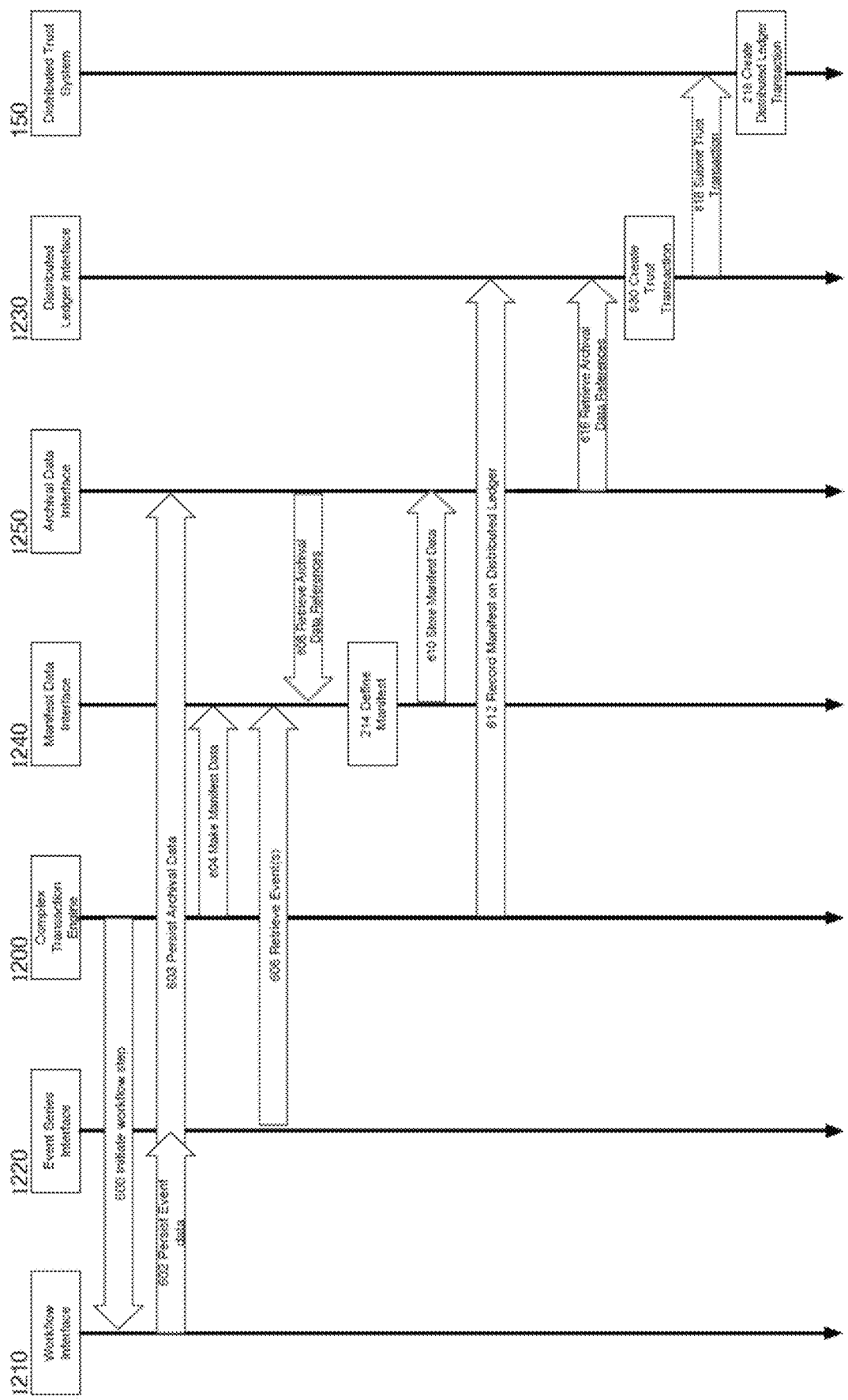
FIG. 6 is a signal diagram illustrating a method for representing a complex transaction as cryptographically secure data, according to an embodiment.

FIG. 3 is a flow chart and FIG. 6 is a signal diagram of a method for representing a complex transaction as cryptographically secure data, according to an embodiment. FIG. 6 refers to the workflow interface 1210, the event series interface 1220, the complex transaction engine 1200, the manifest data interface 1240, the archival data interface 1250, and the distributed trust system 110 shown and described above with reference to FIG. 1B, FIG. 3 is described in conjunction with FIG. 6 for ease of description, but it should be understood that the method of FIG. 3 can be performed on any suitable system, including systems that may not include all the structures and/or functionality of the system of FIG. 1B.

At 212, a first (N) transaction work step can be performed. For example, the complex transaction engine 1200 can initiate the first (N) workflow step by sending a signal 600 to the workflow interface 1210. Typically a first (N) transaction work step will be an origination event, although it should be understood that in some instances the first transaction work step may refer to an action or transaction of an already-existing complex transaction or an action or transaction that predates the origination of a complex transaction, such as preliminary actions or transactions that a contemplated complex transaction will reference or incorporate. In some instances, the first (N) transaction work step can be the execution of a smart contract. For example, a smart contract configured to initiate the complex transaction can be defined and submitted to a distributed ledger. When the conditions associated with the smart contract are satisfied, the smart contract can automatically execute causing the complex transaction to initiate, for example, by defining and distributing tokens associated with the complex transaction.

The first transaction work step will typically create, rely on, and/or reference one or more data products. For example, the first (N) transaction work step may reference one or more assets (e.g., deeds, notes, supply contracts, etc.), may create tradeable shares or tokens (e.g., ownership interests in asset(s)), may include origination documents describing the terms and conditions of the complex transaction, may distribute shares or tokens to stakeholders, and so forth. Some data products may be created automatically, for example through the execution of a smart contract, while other data products may be created manually, for example through legal or financial drafting. Data products can be stored on or represented on a distributed ledger (e.g., tokens, smart contracts, etc.), in traditional electronic data repositories (e.g., on a secure server, on a cloud-based data repository, on a local storage device, etc.), or maintained in physical form (e.g., original deeds or notes). A data product can also describe steps to be taken to perform a transaction work step and/or conditions that caused the transaction work step to be performed.

The workflow interface 1210 can send signals 602 and/or 603 to the event series interface 1220 and/or archival data interface 1250, respectively, which can be operable to cause the event series interface 1220 and/or the archival data interface 1250 to store data products created, relied on, or referenced by the first (N) transaction work step. Specifically, the event series interface 1220 can cause data products to be stored to the distributed ledger 110 and/or the archival data interface 1250 can be operable to cause data products to be stored to a non-distributed ledger data repository.

At 214, a first (N) manifest document can be defined. The first (N) manifest document can be defined by the complex transaction engine 1200 sending signal 604 to the manifest data interface 1240. Furthermore, the manifest data interface 1240 can retrieve activity from the event series interface 1220 and/or the archival data interface 1250 as shown as signals 606 and 608, respectively.

The first (N) manifest document can include or reference data products defined, relied on, or referenced by the first transaction work step. The first (N) manifest document can also include a description of the activity that caused the first (N) manifest document to be defined. For example, in some instances, the first manifest document can include a list of checksums, hashes, and/or fingerprints suitable to identify each data product defined, relied on, or referenced by the first transaction work step. In some instances a complete copy of some or all data products associated with the first transaction work step can be incorporated into or packaged with the first manifest document. In some instances, a data product can identify a location on a distributed ledger or other data storage system where a data product can be located. In some instances, a data product can identify an authorized user or entity. Another type of data product can include an authorized user/entity certifying, for example through a cryptographic signature, the status of an asset. A certification by an identified and authorized user/entity is particularly well suited for non-digital data products or assets. For example, a bank or broker can certify that a physical asset or an original note or deed is in its possession and make representations regarding the contents or status of that asset. The first (N) manifest document can reference different data products in different ways (e.g., a complete copy of one data product can be incorporated into the manifest, while a digital fingerprint and metadata description of another data product can be listed). It should also be understood that some data products may be identified in the manifest by multiple techniques, such as by including a complete copy of the data product into the manifest and referencing an external data source (e,g., a blockchain location, a SEC document identifier, etc.). In some instances, the distributed ledger interface 1230 can be operable to retrieve data products (signal 616) from the distributed ledger interface 1230 based on a reference or indicator associated with data product(s), which can be included in the first (N) manifest document as an archival data reference 1264.

At 216, the first (N) manifest document and/or data products associated with the first (N) manifest document can be encoded to produce a first (N) encrypted archive. At 218, the first (N) encrypted archive can be submitted for validation on a distributed ledger system, such as the ethereum network. For example, the complex transaction engine 1200 can send signal 612 to the distributed ledger interface 1230 to cause the distributed ledger interface 1230 to create a trust transaction (e.g., an ERC-20 token) at 630 and to send signal 618 to the distributed trust system 110 to cause the distributed trust system 110 to validate the trust transaction. The distributed ledger can validate the first (N) encrypted archive, committing it to the distributed ledger. In addition or alternatively, the manifest data interface 1240 can be operable to send signal 610 to the archival data interface 1250 to cause the archival data interface 1250 to cause the encrypted archive to be stored in a non-distributed ledger data repository.

Events similar to those described above with reference to 212, 214, 216, and/or 218 can be repeated any number of times for each activity associated with the complex transaction. For example, at 222, a second (N+1) transaction work step can be performed, which can be similar to the first (N) transaction work step performed at 212. The second transaction work step can define, reference, and/or rely upon additional data products and/or can be associated with previously referenced data products (e.g., data products associated with the first (N) transaction work step performed at 212). As illustrated at 232, another (N+x) transaction work step can be performed. Again, the N+x transaction work step can define, reference, and/or rely upon new or previously generated data products. Work steps can include, for example, generating documents, logging a document into a data repository (e.g., other than a distributed ledger), detecting that an individual has accessed a document stored in a data repository, verifying that an investor is accredited (e.g., a compliance officer can certify that an investor is accredited), registering a payment against a debt instrument, paying a dividend to an investor, transferring an ownership stake (or token) from one entity or compute device to another entity or compute device, and so forth.

Similar to the defining the first (N) manifest document at 214, a manifest document that includes or references data products associated with each transaction work step (e.g., the N+1 transaction work step, the N+x transaction work step) can be defined at 224 and 234. Each manifest document can include or reference a previous manifest document. Because manifest documents are created as the complex transaction unfolds, manifest documents may not reference future or not-yet-defined manifest documents. For example, the second (N+1) manifest document can include or reference the first (N) manifest document. A third (N+2) manifest document (not shown) can include or reference the second (N+1) manifest document, and so forth. In some instances, a manifest document can include or reference all previous manifest documents (e.g., the third manifest document can include or reference the second (N+1) manifest document and the first (N) manifest document). In other instances a manifest document may only reference an immediately previous manifest document.

Typically each manifest document will be associated with multiple activities of the complex transaction, although in some instances a manifest document will be associated with only a single activity or work step. Typically a manifest document will be associated with all work steps or activities that have occurred since the last manifest document was defined. For example, work steps and/or data products can be batched such that one manifest document references multiple work steps and/or data products. For example, manifest documents can be automatically defined daily, weekly, or on any other suitable pre-defined schedule. In addition or alternatively, a manifest document can be defined in response to a manually initiated process, for example in response to an important or critical work step having been performed (e.g., deal closing, regulatory approval, etc.).

At 226 and 236, manifest documents defined at 224 and 234 and/or data products associated with those manifest documents can be encoded to produce encrypted archives. At 228 and 238, such encrypted archives can be submitted for validation on a distributed ledger system. Typically, each encrypted archive will be recorded on a single distributed ledger, but in some embodiments, at least some encrypted archives can be recorded on different distributed ledgers. For example, one encrypted archive can be recorded on the public ethereum ledger, another encrypted archive can be recorded on another ledger (optionally operating under a different protocol, such as ripple), and another encrypted archive can be recorded on a private ethereum ledger. Thus, each encrypted archive can be recorded to an immutable block of a distributed ledger. Batching data products and/or work steps as discussed above can reduce the number of blocks written to the distributed ledger, which can reduce transaction costs and allow the ledger to be used more efficiently. Similarly stated, cost and computational resource savings can be realized by defining manifests that selectively batch data products and work steps. For example, in some instances, activities associated with the complex transaction can occur faster than blocks are written to the distributed ledger. Defining a manifest that includes or references a batch of work steps and data products can enable data generated according to a relatively fast-moving process (the complex transaction) to be recorded on a relatively slow-moving data record (the distributed ledger).

In some embodiments, encrypted archives and/or manifest documents can themselves be stored as data products on a non-distributed ledger storage system. In this way, the parallel storage strategies (on the distributed ledger and off the distributed ledger) can improve data resiliency and reduce the possibility of data loss (for example, if an archive is not accepted to the distributed ledger), Similarly stated, after a manifest document is defined and/or encrypted, one copy of the manifest document can be stored in a traditional data repository (e.g., local or cloud storage) and another copy of the manifest document can be recorded to the distributed ledger. As discussed above, because each manifest document can reference one or more previous manifest documents, the manifest documents can establish a chain of trust that is independent of the distributed ledger.

Figure 4:
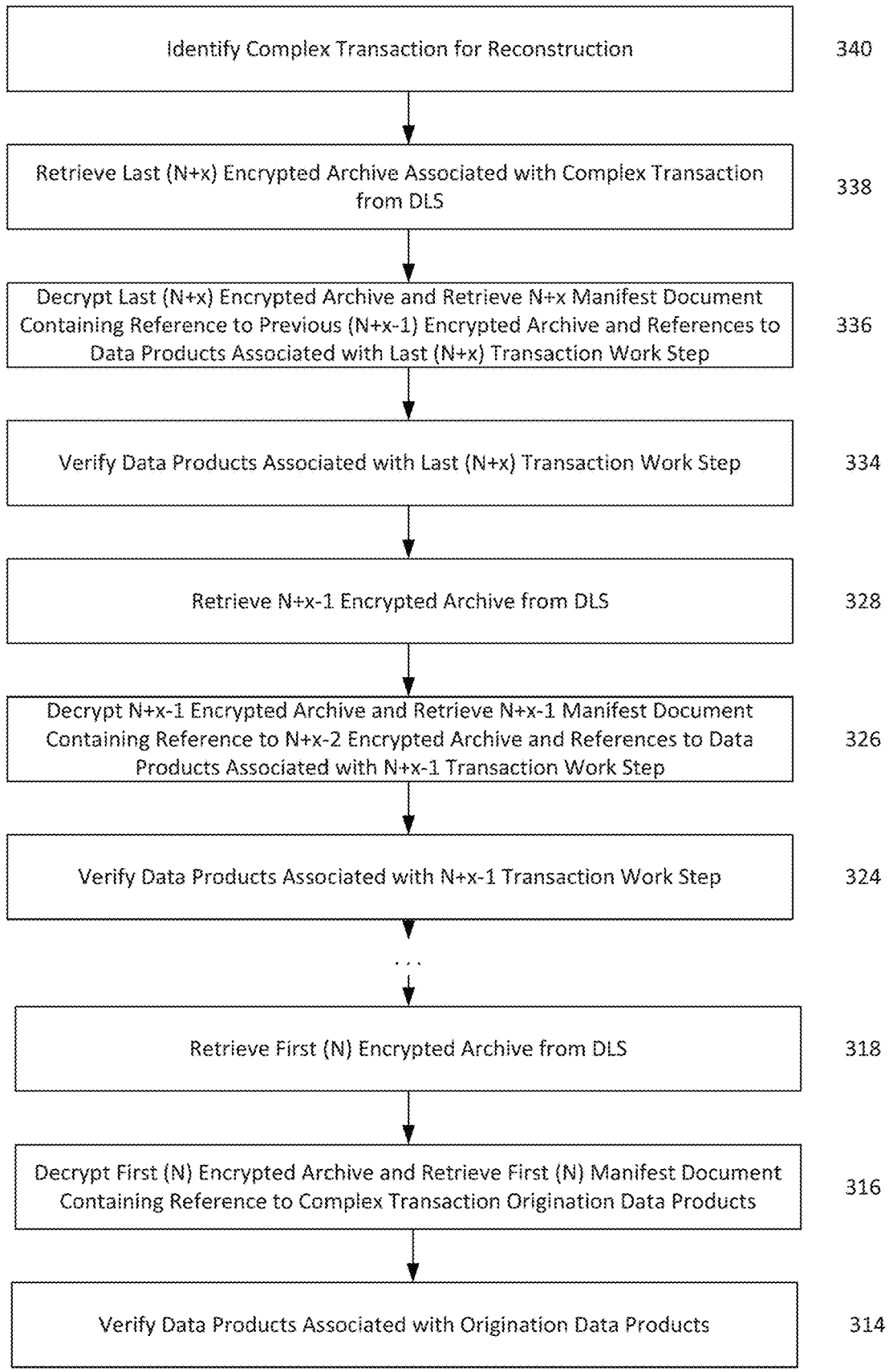
FIG. 4 is a flow chart of a method for processing cryptographically-secured data stored in a distributed ledger and data products stored off the distributed ledger to reconstruct a complex transaction, according to an embodiment.
Figure 7:
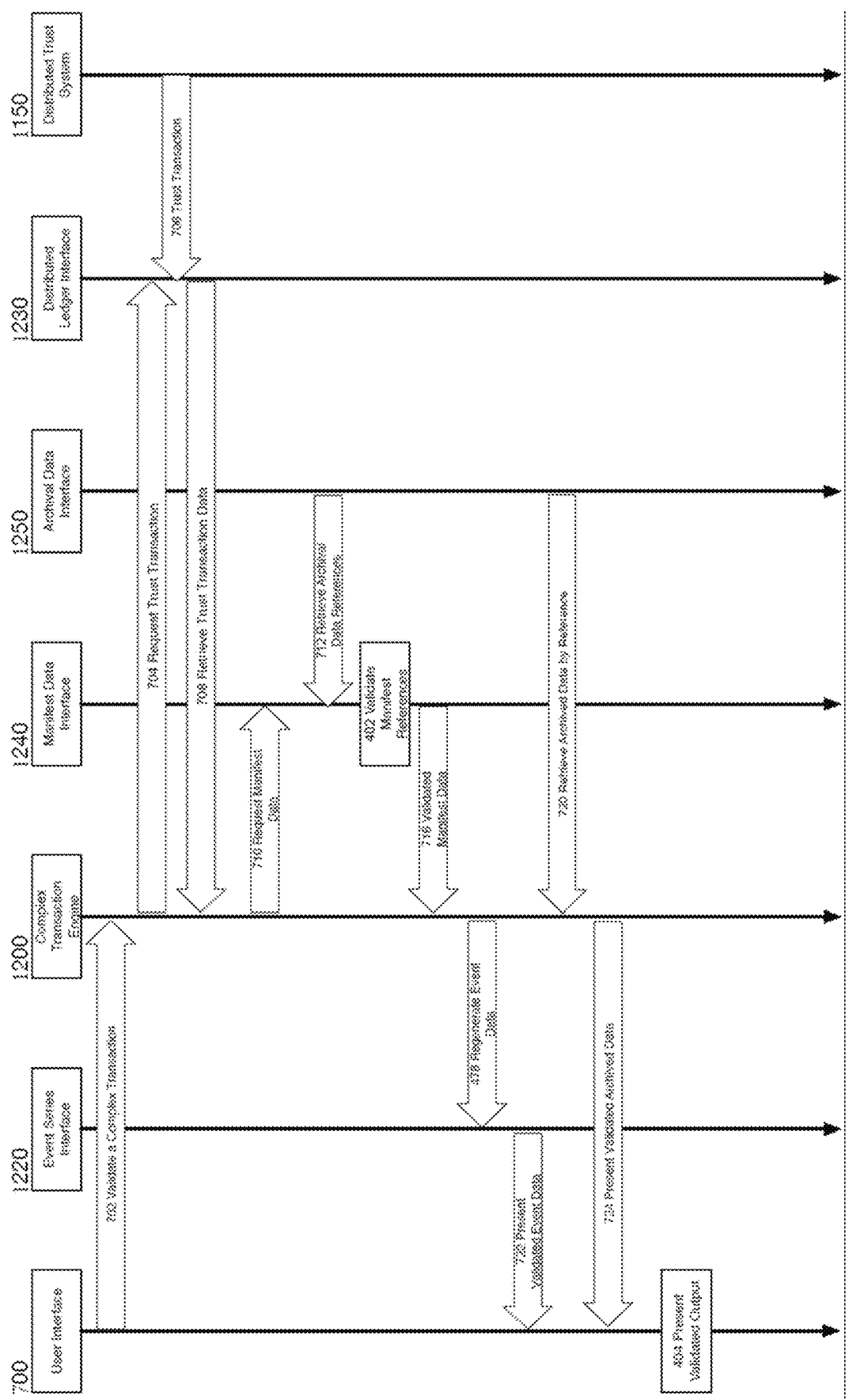
FIG. 7 is a signal diagram illustrating a method for processing data stored in a distributed ledger and data products stored off the distributed ledger to reconstruct a complex transaction, according to an embodiment.

FIG. 4 is a flow chart and FIG. 7 is a signal diagram of a method for processing cryptographically-secured data stored in a distributed ledger and data products stored off the distributed ledger to reconstruct a complex transaction, according to an embodiment. FIG. 7 refers to the event series interface 1220, the complex transaction engine 1200, the manifest data interface 1240, the archival data interface 1250, and the distributed trust system 110 shown and described above with reference to FIG. 1B. FIG. 4 is described in conjunction with FIG. 7 for ease of description, but it should be understood that the method of FIG. 4 can be performed on any suitable system, including systems that may not include all the structures and/or functionality of the system of FIG. 1B.

The method described above with reference to FIG. 3 describes an embodiment by which archives associated with events of a complex transaction can be stored on a distributed ledger system. The method shown in FIG. 4 generally relates to an embodiment by which such archives can be "unpacked" and, optionally, combined with other data stored on a distributed ledger and/or data stored off the distributed ledger to understand, recreate, simulate, verify, audit, study, etc. the complex transaction.

At 340 a complex transaction can be identified. In some embodiments, the complex transaction can be identified by a reference to the complex transaction in a token associated with the complex transaction. For example, an individual or entity involved in the transaction (e.g., a shareholder, trader, payee, etc.) can be in possession of a token that establishes that individual or entity's interest in the complex transaction. In some instances, an individual involved in the transaction or an analyst studying the transaction (e.g., an auditor, an individual conducting diligence on the complex transaction, a financial advisor, etc.) can select a complex transaction for validation via a user interface 700, for example by selecting an icon representing a token, a manifest document or encrypted archive associated with the complex transaction (e.g., retrieved from a non-distributed ledger data repository) or selecting a representation of any other suitable artifact associated with the complex transaction.

At 338, an encrypted archive associated with the complex transaction can be retrieved from a distributed ledger. For example the complex transaction engine 1200 can receive an indication of the complex transaction 702 from the user interface 700, send signal 704 to the distributed ledger interface 1230, such that the distributed ledger interface 1230 accesses the distributed ledger 110 and retrieves 706 the encrypted archive, which can be returned 708 to the complex transaction engine 1200.

Typically the first encrypted archive associated with the complex transaction to be retrieved will be the last (N+x) encrypted archive committed to the distributed ledger. Similarly stated, typically reconstructing a complex transaction will begin by retrieving an encrypted archive associated with the most recent activity in the complex transaction. It should be understood, however, that in some instances, reconstructing a complex transaction (or a portion of a complex transaction) can begin with an archive associated with any activity (not necessarily the last or most recent activity) in the complex transaction.

At 336, the (N+x) archive can be decrypted. In some instances, a token that establishes an individual or entity's interest in the complex transaction can include a decryption key by which data associated with the complex transaction can be retrieved. Similarly stated, a token (e,g., a ERC-20 token) that connotes ownership or interest in a complex transaction or security can include a decryption key by which archives associated with the complex transaction can be decrypted. In this way, individuals and/or entities associated with the complex transaction can be empowered to access, examine, validate, audit, etc. archives of the complex transaction. Similarly stated, a digital token can act as a reference to one or more trust chains. For example, a token can act as a reference to a chain of encrypted archives stored in the distributed ledger by virtue of the token and one or more of the encrypted archives having a common parent (e.g., a smart contract). As discussed in further detail herein, this can enable individuals and entities with an interest in the complex transaction to verify a chain of trust back to the origination of the complex transaction. In some instances a token connoting an ownership interest in a complex transaction can include a decryption key operable to decrypt all archives associated with the complex transaction. In other instances at least some tokens connoting an interest in a complex transaction can be more limited and operable only to decrypt some archives associated with the complex transaction. For example, access to highly sensitive or confidential data may be restricted from some token holders.

By decrypting the last (N+x) archive a last (N+x) manifest document and/or data products associated with the last (N+x) manifest document can be retrieved. As discussed above with reference to event 234, the last (N+x) manifest document can contain or reference an immediately-previous manifest (N+x−1) associated with an immediately previous (N+x−1) activity in the complex transaction and/or other earlier manifests associated with other earlier activity in the complex transaction, optionally dating back to a first (N) manifest document associated with an origination (N) of the complex transaction.

Furthermore, as discussed above with reference to events 214, 224, and 234, manifest documents can include or reference data products associated with the complex transaction. For example, the last (N+x) manifest document can describe (optionally, in computer executable form) the conditions that caused an activity associated with the last (N+x) manifest document to be defined. Additionally, the last (N+x) archive and/or manifest document can include or reference data products that were defined as a result of or otherwise associated with the last (N+x) activity in the complex transaction. The last (N+x) manifest document can include or reference data products stored on the distributed ledger from which the last (N+x) archive was retrieved, can reference data products stored in other locations, and/or can include a certification by an identified and authorized user/entity as to the content and/or status of an asset or data product. Manifest documents can further reference one or more tokens that are operable to decrypt archives, for example by name and/or token symbol. In some such embodiments, the relationship between such tokens and archives/manifest documents may be bidirectional. The complex transaction engine 1200 can be operable to send signal 710 to the manifest data interface 1240 to cause the manifest data interface 1240 to retrieve 712 data products from their storage location(s).

As discussed above, an activity associated with the complex transaction can define, reference, or rely upon a wide variety of data products, such as transaction records, audit reports, regulatory filings, and so forth. At 334, data products referenced by or incorporated in the last (N+x) archive and/or manifest document can be verified by any suitable means. For example, certifications by identified and authorized individuals or entities can be checked to verify the identity of the authorized individuals using a public/private key signature verification technique, certifications can be checked against primary documentation, the existence and/or content of expected/required audit reports or regulatory filings can be reviewed, and so forth. If evidence of tampering is revealed, for example, if an "authorized" cryptographic signature cannot be verified, if expected data products are missing, or so forth, an alert can be generated such that a further investigation into the irregularity can be conducted.

Because manifest documents (other than the first (N) manifest document) each reference at least one previous manifest document, an individual, entity, or compute device with sufficient permissions having a single manifest document can walk up the chain of trust established by manifest-to-manifest references to recreate the entire complex transaction from that manifest document to the origination of the complex transaction. Similarly stated, each manifest document will allow an individual, entity, or compute device to identify where a previous manifest document is stored. If that individual, entity, or compute device has access to the storage location (e.g., has a decryption key that can decrypt an archive stored on a distributed ledger or has access to a password-protected data repository containing manifest documents), that individual, entity, or compute device can move from manifest-reference to manifest reference to retrieve all the manifests for the complex transaction. Furthermore, because each manifest document can contain a checksum or fingerprint of at least one previous manifest, an individual, entity, or compute device reading manifest documents can be assured that if the fingerprint or checksum of that manifest document matches the fingerprint or checksum reported in a subsequent manifest document then that manifest document has not been altered any time after the subsequent manifest document was defined.

Therefore, based on a reference contained in the last (N+x) manifest document, a previous (N+x−1) encrypted archive can be identified, retrieved from the distributed ledger, and decrypted, at 326, such that a previous (N+Fx−1) manifest document and/or associated data products can be retrieved. Events 328 and 326 can be similar to events 338 and 336 discussed above, At 324, the previous (N+Fx−1) manifest document can be verified by computing a hash or fingerprint on the previous (N+x−1) manifest and comparing that hash or fingerprint against a hash or fingerprint reported in the last (N) manifest document. In addition or alternatively, at 324, data products identified by or incorporated in the previous (N+x−1) manifest document can be verified. In instances in which data products or transactions identified in the last (N+x) manifest document depend upon actions or data products that were supposed to have occurred or be associated with an activity associated with the previous (N+x−1) manifest document the occurrence of such actions and/or existence/contents of such data products can be verified. For example, if the last (N+x) manifest document indicates a payment to a shareholder was made, the previous (N+x−1) manifest document (and/or associated data products) can be checked to verify that the shareholder was a shareholder in good standing and entitled to a payment at the time the previous (N+x−1) manifest document was generated. Again if verification fails, an alert can be generated such that a further investigation into the irregularity can be conducted.

In some instances, if a chain of trust is broken, for example, if an expected archive is missing from the distributed ledger or off-ledger data repository, an alert can be generated, but the transaction can be validated based on redundantly stored data. Such redundantly stored data can, in some instances, be validated using a hash or checksum recorded in a later manifest document. For example, if an encrypted archive containing the previous (N+x−1) manifest document is not located on the distributed ledger in the expected location, the previous (N+x−1) manifest document can be retrieved from a non-distributed ledger data repository. The last (N+x) manifest document can contain a checksum or hash of the previous (N+x−1) manifest document, which can be used to validate the copy of the previous (N+x−1) manifest document that was retrieved from a non-distributed ledger (e.g., non-immutable) data repository.

This process can be repeated indefinitely, for example, until a first (N) encrypted archive associated with the complex transaction is retrieved from the distributed ledger at 318. The first encrypted archive can be decrypted to retrieve a first (N) manifest document, at 316. Typically the first (N) manifest document will be associated with an origination of the complex transaction and incorporate or reference origination data products. It should be understood, however, that in some instances, the first manifest document may not be associated with origination of a complex transaction. Similarly stated, in some embodiments, data associated with a complex transaction can be first committed to a distributed ledger sometime after or sometime before the complex transaction was initiated. Data products associated with the first (N) manifest document can be verified at 314.

Figure 5:
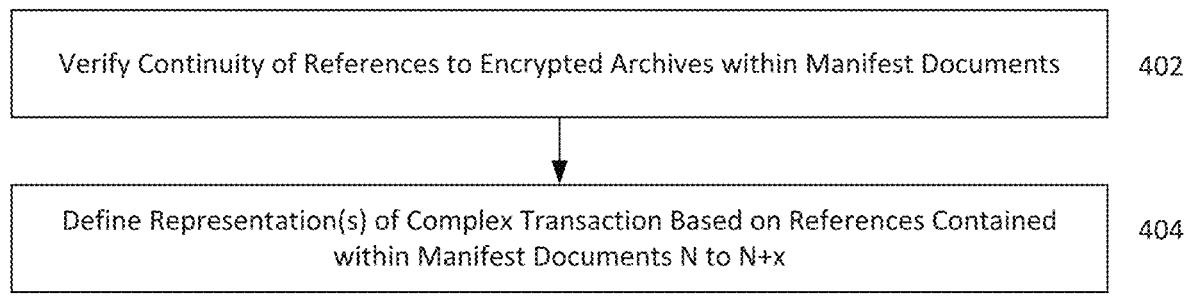
FIG. 5 is a flow chart of a method of simulating, replaying, and/or verifying a complex transaction, according to an embodiment.

FIG. 5 is a flow chart of a method of simulating, replaying, and/or verifying a complex transaction, according to an embodiment. In some instances, the method of FIG. 5 can be performed in conjunction with the method described above with reference to FIGS. 4 and 7. For example, the manifest documents retrieved during the performance of the method of FIG. 4 and/or the data products referenced and/or included in the manifest documents can be used during the performance of the method of FIG. 5.

As discussed above, each manifest document encrypted and committed to the distributed ledger as an archive can be associated with an activity of the complex transaction. Furthermore, the distributed ledger can ensure that each manifest document is permanently and immutably stored. Additionally, each manifest document can reference one or more previous manifest documents (including, for example, a checksum or fingerprint of the previous manifest document(s)), establishing a chain of trust that is not dependent upon the distributed ledger. Thus, performing the method of FIG. 4 can allow an individual or entity to obtain a manifest document for each activity that has occurred in a complex transaction from a first (N) activity to a last (N+x) activity.

At 402, a continuity of references to encrypted archives can be verified. As discussed above, each manifest document can include a reference to and/or unique description (e.g., a fingerprint or checksum) of one or more previous encrypted archives committed to the distributed ledger. Therefore at 402, a chain of activities of the complex transaction can be verified by sequentially verifying that an unbroken chain of manifest documents exists. Similarly stated, the last (N+x) manifest document can be examined to identify the location of the next-to-last (N+x−1) archive on the distributed ledger, which can be decrypted to retrieve the next-to-last (N+x−1) manifest document. The next-to-last (N−x−1) manifest document can in turn be examined to identify the location of the second-next-to-last (N+x−2) archive on the distributed ledger and so on and so forth, until the second (N+1) archive is decrypted to retrieve the second (N+1) manifest document. The second (N+1) manifest document can reveal the location of the first (N) archive, which can be decrypted to retrieve the first (N) manifest document, which can include or reference the origination data products of the complex transaction.

At 404, a representation of the complex transaction can be replayed or simulated by retrieving the origination data products from the first (N) manifest document, then identifying an activity associated with the second (N+1) manifest document, which may include reviewing, executing, verifying, or otherwise analyzing data products contained within or referenced by the first (N) and/or second (N+1) manifest document. For example, as shown with reference to FIG. 7, the complex transaction engine 1200 can retrieve 716, 720 validated manifest data and data products from various data repositories This process can be repeated indefinitely until an activity associated with the last (N+x) manifest document is identified. Trust and validity of the current state of the complex transaction can be verified by replaying and/or simulating each action that caused a manifest document to be generated, encrypted, and committed to the distributed ledger (e.g., as described above with reference to FIG. 3). Furthermore, because the manifest documents can include or reference each data product or artifact associated with each activity in the complex transaction, a complete description of the state of the complex transaction at any point in time can be recreated, visualized, and/or otherwise analyzed. The manifest documents can also be operable to provide a fingerprint or checksum of each externally stored data (e.g., data products not stored on the distributed ledger) such that an analyst can be assured that external data products remain intact and unmodified from their initial creation. The manifest documents can further include a description of each activity that caused that manifest document to be defined and/or code operable to cause a simulation of each activity to be executed.

The full complex transaction from first activity to most recent activity, or the complex transaction at any point in time can thereby be expressed as a human readable narrative describing the complex transaction, computer-executable instructions to simulate the complex transaction at a future time, examine a state of the complex transaction under counter-factual conditions (e.g., if an activity such as a trade had not occurred or had occurred differently) and so forth. The simulation of the complex transaction can be used to produce compliance reports for governmental regulators or any other suitable report for any suitable party. The simulation of the complex transaction can be used to present a redacted view of the transaction, for example, to preserve confidential or proprietary data associated with the complex transaction. As shown in FIG. 7, signals 722 and 724 represent that the user interface 700 can present data received from the complex transaction engine 1200 and/or the event series interface 1220, respectively.

The above-described methods can be performed on compute devices, such as client computer devices, servers, mainframe computers, etc. For example, the distributed trust system can be implemented on one or more servers interconnected by a network such as a wireless network(s), wired network(s), the Internet, an intranet(s) and/or any combination thereof. For other examples, the execution of complex multi-step transactions, the production of transaction records, the cryptographically encoding of those transaction records, the affixing of appropriate tamper-proof data signatures, and the submission of such information to a distributed trust system can be performed by user compute devices (e.g., client devices) that operatively coupled to the distributed trust system via the above-described network. Similarly, any reconstruction of the complex multi-step transactions and representation of the related data can be performed by the user compute devices accessing the distributed trust system.

It should be understood that each compute device can include a processor and a memory operatively coupled to that processor. Such a memory can be a non-transitory computer-readable medium (also can be referred to as a non-transitory processor-readable medium or memory) having instructions or computer code thereon for performing various computer-implemented operations and for execution by the processor. The computer-readable medium (or processor-readable medium) is non-transitory in the sense that it does not include transitory propagating signals per se (e.g., a propagating electromagnetic wave carrying information on a transmission medium such as space or a cable), The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. An apparatus, comprising:
a first compute device, including a non-transitory processor readable memory and a processor, the first compute device communicatively coupled to a second compute device, the second compute device being from a plurality of compute devices that collectively implement a distributed ledger via a network that operably couples to the plurality of compute devices, the distributed ledger including:
  a first manifest document that includes (1) a first reference to a first data product stored in a first non-blockchain database and (2) a fingerprint of the first data product, and
  a second manifest document that includes (1) a second reference to the first manifest document, (2) a fingerprint of the first manifest document, and (3) a third reference to a second data product stored in a second non-blockchain database; and
the processor operatively coupled to the non-transitory processor readable memory, the processor configured to:
  receive an indication of an activity associated with a third data product,
  define a third manifest document that includes (1) the fingerprint of the first manifest document, (2) a fifth reference to the second manifest document, (3) a fingerprint of the second manifest document, and (4) a sixth reference to the third data product, and
  commit the third manifest document to the distributed ledger.

2. The apparatus of claim 1, wherein the processor is configured to encrypt the third manifest document to produce an archive, the archive committing the third manifest document to the distributed ledger.

3. The apparatus of claim 1, wherein:
the processor is configured to store a copy of the third manifest document in a third non-blockchain database that includes a copy of the second manifest document and a copy of the first manifest document such that a third compute device with access to the third non-blockchain database is configured to retrieve, without accessing any instance of the distributed ledger:
  (1) the first manifest document based on the third manifest document including the fingerprint of the first manifest document, and
  (2) the second manifest document based on the third manifest document including the fifth reference to the second manifest document.

4. The apparatus of claim 1, wherein:
the processor is configured to store a copy of the third manifest document in a third non-blockchain database that includes a copy of the second manifest document and a copy of the first manifest document such that a third compute device with access to the third non-blockchain database is configured to retrieve, without accessing any instance of the distributed ledger:
  (1) the second manifest document based on the third manifest document including the fifth reference to the second manifest document, and
  (2) the first manifest document based on the second manifest document including the second reference to the first manifest document.

5. The apparatus of claim 1, wherein the first non-blockchain database and the second non-blockchain database are a common non-blockchain database.

6. The apparatus of claim 1, wherein the first data product includes a cryptographic signature of an identified party and a representation of an attestation by the identified party as to a status of an asset.

7. The apparatus of claim 1, wherein the first manifest document includes a fingerprint of a fourth manifest document, the fourth manifest document not being represented in the distributed ledger.

8. The apparatus of claim 1, wherein the first compute device is not from the plurality of compute devices that collectively implement the distributed ledger.

9. The apparatus of claim 1, wherein the second manifest document includes a fingerprint of the second data product.

10. A non-transitory processor readable medium storing code representing instructions configured to be executed by a processor, the code comprising code to cause the processor to:
  define a second manifest document associated with a first activity and a second time, the second manifest document including a fingerprint of a first data product such that the second manifest document is configured to verify that the first data product has not been altered;
  define a third manifest document associated with a second activity and a third time after the second time, the third manifest document including (1) a reference to a second data product, and (2) a fingerprint of a first manifest document that is associated with a first time before the second time; and
  submit the third manifest document to a distributed ledger for validation.

11. The non-transitory processor readable medium of claim 10, wherein the reference to the second data product included in the third manifest document references a network location from which the second data product can be retrieved, the network location not being a location on any distributed ledger.

12. The non-transitory processor readable medium of claim 10, wherein a second archive representing the third manifest document is submitted to the distributed ledger, the code further comprising code to cause the processor to:
  encrypt the first manifest document to produce a first archive; and submit the first archive to the distributed ledger for validation.

13. The non-transitory processor readable medium of claim 10, wherein a second archive representing the third manifest document is submitted to the distributed ledger, the code further comprising code to cause the processor to:
define a smart contract configured to produce a plurality of tokens, at least a subset of the plurality of tokens containing a key that is configured to access the second archive; and
submit the smart contract to the distributed ledger for validation.

14. The non-transitory processor readable medium of claim 10, the code further comprising code to cause the processor to:
define a smart contract configured to generate the second data product, generate a plurality of tokens, and distribute the plurality of tokens to compute devices of a plurality of rights holders;
encrypt the second data product with an encryption key associated with the plurality of tokens to produce a first archive that is accessible to a compute device of a rights holder from the plurality of rights holders in possession of a token from the plurality of tokens; and
submit the smart contract to the distributed ledger for validation.

15. The non-transitory processor readable medium of claim 10, wherein the distributed ledger is an ethereum blockchain.

16. The non-transitory processor readable medium of claim 10, wherein the fingerprint of the first data product is at least one of a hash and a checksum.

17. The non-transitory processor readable medium of claim 10, wherein the distributed ledger is a first distributed ledger, the code further comprising code to cause the processor to submit the first manifest document to a second distributed ledger for validation, the second distributed ledger being different from the first distributed ledger.

18. The non-transitory processor readable medium of claim 10, wherein at least one of the first manifest document and the second manifest document is not represented in the distributed ledger.

19. The non-transitory processor readable medium of claim 10, wherein the third manifest document includes a fingerprint of the second manifest document.

20. The non-transitory processor readable medium of claim 10, wherein the third manifest document includes a reference to the second manifest document and a fingerprint of the second manifest document; and
the second manifest document includes a reference to the first manifest document and the fingerprint of the first manifest document.

21. The non-transitory processor readable medium of claim 10, wherein the second data product is a non-digital artifact maintained in a physical artifact repository.

22. A non-transitory processor readable medium storing code representing instructions configured to be executed by a processor, the code comprising code to cause the processor to:
perform a first work step associated with a first activity and with a first data product;
define a first manifest document that comprises a fingerprint of the first data product such that the first manifest document uniquely identifies the first data product;
perform a second work step associated with a second activity and associated with a second data product;
define a second manifest document that comprises a fingerprint of the second data product and a fingerprint of the first manifest document such that the second manifest document uniquely identifies the second data product and the first manifest document, the second manifest document's unique identification of the first manifest document defining a first chain of trust between the first work step and the second work step; and
define an immutable data structure representing a second chain of trust independent of the first chain of trust by submitting the first manifest document and the second manifest document to a distributed ledger for validation.

23. The non-transitory processor readable medium of claim 22, wherein the code representing instructions to cause the processor to perform the first work step is a smart contract configured to automatically execute on a virtual machine of the distributed ledger when predicate conditions of the smart contract are satisfied.

24. The non-transitory processor readable medium of claim 22, wherein the code representing instructions to cause the processor to perform the second work step includes code to cause a data product to be generated in response to an operation performed by a user.

* * * * *